(12) United States Patent
Rau et al.

(10) Patent No.: US 6,322,102 B1
(45) Date of Patent: Nov. 27, 2001

(54) AIRBAG SYSTEM WITH CONTROLLED INFLATION

(75) Inventors: Sven Rau, München; Siegfried Pantke, Peiting, both of (DE)

(73) Assignees: Autoliv Development AB (SE); Bayerische Motorwerke AG (DE)

( * ) Notice: Subject to any disclaimer, the term of this patent is extended or adjusted under 35 U.S.C. 154(b) by 0 days.

(21) Appl. No.: 09/700,607

(22) PCT Filed: May 5, 1999

(86) PCT No.: PCT/EP99/03059

§ 371 Date: Jan. 16, 2001

§ 102(e) Date: Jan. 16, 2001

(87) PCT Pub. No.: WO99/59846

PCT Pub. Date: Nov. 25, 1999

(30) Foreign Application Priority Data

May 15, 1998 (DE) ............................................. 198 21 838

(51) Int. Cl.[7] .................................................. B60R 21/26
(52) U.S. Cl. ............................................ 280/736; 280/742
(58) Field of Search .................................. 280/736, 737, 280/739, 740, 741, 742

(56) References Cited

U.S. PATENT DOCUMENTS

| 3,752,500 | * | 8/1973 | Culver ................................. 280/736 |
| 3,787,067 | * | 1/1974 | Bernard .............................. 280/736 |
| 4,006,919 |   | 2/1977 | Neuman . |
| 4,021,058 |   | 5/1977 | Suzuki et al. . |
| 4,421,342 |   | 12/1983 | Brown, Jr. . |
| 5,803,494 | * | 9/1998 | Headley .............................. 280/741 |
| 5,913,536 | * | 6/1999 | Brown ............................... 280/730.2 |
| 6,126,195 | * | 11/2000 | Lutz .................................... 280/737 |

FOREIGN PATENT DOCUMENTS

| 196 20 617 A1 | 11/1997 | (DE) . |
| 196 37 603 A1 | 3/1998 | (DE) . |
| 0 769 428 A2 | 4/1997 | (EP) . |

* cited by examiner

*Primary Examiner*—Paul N. Dickson
*Assistant Examiner*—Faye M. Fleming
(74) *Attorney, Agent, or Firm*—R. W. Becker & Associates; R. W. Becker

(57) ABSTRACT

The invention relates to an airbag system in a safety system, especially in motor vehicles, including a gas generator arranged in a gas guide housing (10), and at least one airbag connected to an assigned connection opening (11). The inventive airbag system also has a sliding element (16) which can be relatively displaced in the gas guide housing. The sliding element is provided as a valve element for controlling the inflation process of the airbag. An additional opening for connecting an additional airbag is configured in the airbag system. The sliding element is also configured as a sliding sleeve (16) which encompasses the tubular gas generator in a concentric manner and which can be displaced between an opened position and a closed position for the connection opening (11), the opening being radially configured in the wall of the gas guide housing (10).

18 Claims, 1 Drawing Sheet

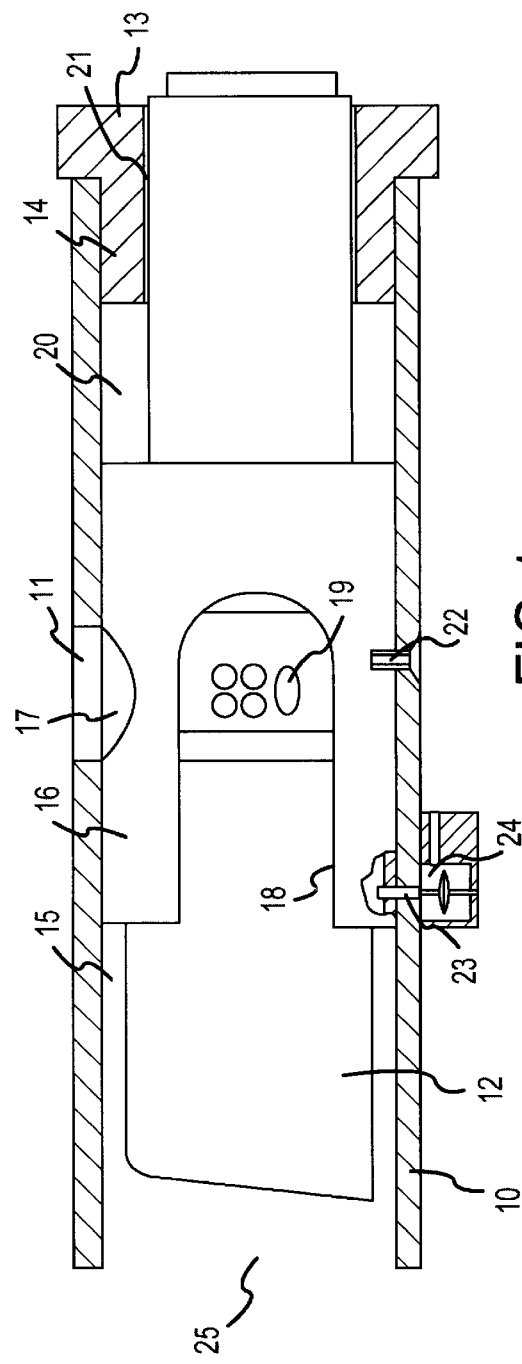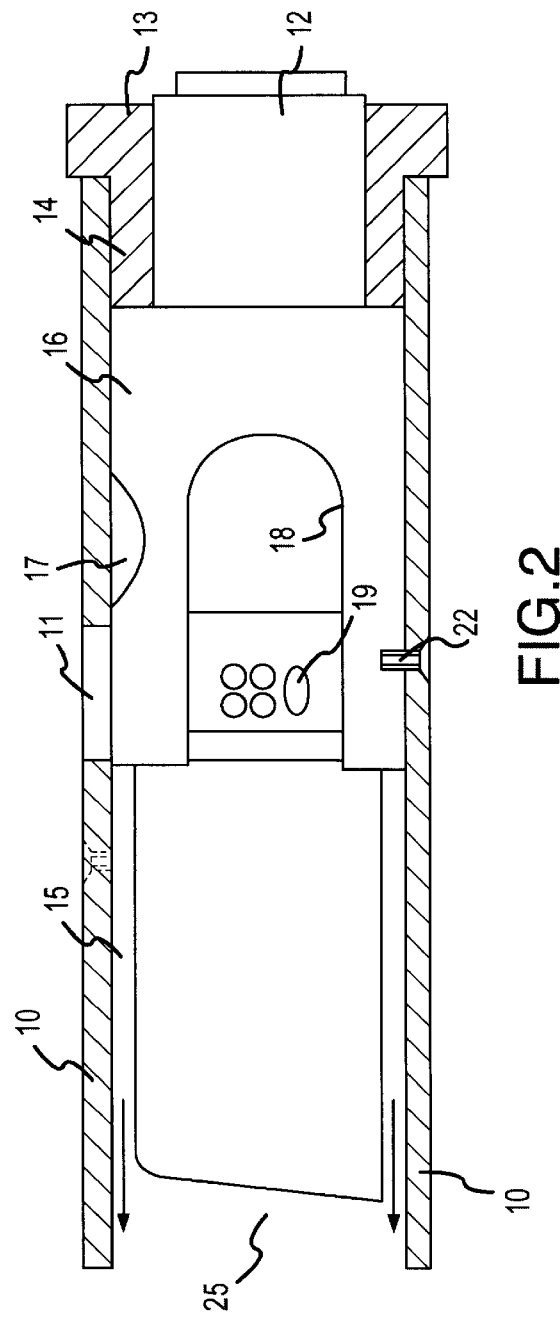

AIRBAG SYSTEM WITH CONTROLLED INFLATION

BACKGROUND OF THE INVENTION

The present invention relates to an airbag arrangement in a safety system, especially in motor vehicles, with a gas generator arranged in a gas guide housing and at least one inflatable airbag connected to an assigned connection opening of the gas guide housing, and with a sliding element that can be displaced between two positions relative to the connection opening of the gas guide housing as a valve member for controlling the inflation process of the airbag, whereby the sliding element can be translationally moved in the gas guide housing that is sealed with a cover at one side, the cover acting as a stop for the sliding element, and the sliding element in its first position is arranged at a distance from the cover, this distance constituting the possible displacement path such that the gas released by the gas generator acts on one side of the sliding element causing the pressure level on each side of the direction of movement of the sliding element to be different and causing the sliding element to move in the direction of its second position.

U.S. Pat. No. 4,006,919 describes an airbag arrangement with the aforesaid features. Arranged in the gas guide housing for controlling the gas flow from the gas guide housing into the airbag is a sliding element that is movable between two positions using one of the different pressure levels on either side of the sliding element. This known airbag arrangement is associated with the disadvantage that one or more additional connections for additional airbags cannot be triggered with the known sliding element.

Known from DE 196 20 617 A1 is furthermore an airbag arrangement with an inflation control in which the gas flow produced by the gas generator is conducted into an additional intermediate housing in which is arranged a component for generating a dynamic pressure that projects into the gas flow end and acts as a displacement force for a sliding element that acts as a valve member for controlling connection openings for preferably a plurality of airbags; the sliding element is fixed in its starting position exposing the cross-section of the connection openings via controlled releasable fastening means.

Although with the known inflation control it is already possible to control the inflation of one or even a plurality of attached airbags, if necessary also as a function of calculated collision data, whereby the movement of the sliding element is actuated by the released flow of gas itself without any need for outside energy, producing and installing the control apparatus is still a complex process because the intermediate housing is interposed therein and because of the component that produces the dynamic pressure for controlling the actual sliding element.

The object of the present invention is therefore to arrange a simple and effective control of the inflation process of at least two airbags attached to the gas guide housing in an airbag arrangement having the foregoing features.

SUMMARY OF THE INVENTION

This object is achieved, including advantageous embodiments and further developments of the invention, by the contents of the patent claims that follow this specification.

The basic idea of the present invention provides that an additional opening for connecting an additional airbag is formed on the side of the gas guide housing opposite the cover of the gas guide housing and the sliding element is embodied as a sliding sleeve that concentrically surrounds the tubular gas generator and that is displaceably arranged in the annular gap between gas generator and gas guide housing between an open position and a closed position for the connection opening, which is radially formed in the wall of the gas guide housing. The invention has the advantage that the sliding element itself is actuated and driven directly by the gas flow. Due to the different levels of pressure that occur on both sides of the axis of motion of the sliding element, a resulting force occurs in the desired direction of movement of the sliding element so that corresponding displacement of the sliding element from its open position to the closed position is effected within a very short period of time. The invention is particularly effectively embodied when the additional opening is arranged axially opposite the cover.

In accordance with one exemplary embodiment of the invention, it can be provided that the sliding sleeve has at least one U-shaped open section running in its longitudinal direction and closed in the direction of the closed position of the sliding sleeve for exposing the gas discharge openings of the gas generator. It is possible to transfer the gas flow from the gas discharge openings of the gas generator via the open section into the radially arranged connection opening for the airbag. In addition, the arrangement of the open section or of a plurality of open sections can be used to change the effective end face surface of the sliding sleeve on its pressure side and thus to cause the sliding sleeve to move differently.

In order to prevent the sliding sleeve from rotating relative to the gas guide housing during its displacement, it can be provided that the sliding sleeve is guided during its displacement relative to the gas guide housing by means of an anti-rotation element, whereby preferably the anti-rotation element is a pin that has been inserted into the wall of the gas guide housing and that has been guided into a longitudinal hole in the sliding sleeve.

In a further embodiment of the invention, it can be provided that the sliding element is guided on the g as guide housing with a rotational movement that overlaps its translational movement, whereby this simultaneously involves restricted guidance and provides a good seal to the open position because the open position is displaced both axially and radially to the closed position. In addition, the sliding element can have a guide slot that engages the pin arranged at the gas guide housing, that is longitudinally helical, and that extends circumferentially.

In order to be able to define the beginning of the displacement of the sliding sleeve as a function of the gas pressure that occurs, it can be provided that the sliding sleeve is fixed in its open position by means of releasable fastening means. In alternative exemplary embodiments the fastening means can be embodied as either a shearing pin or a locking connection that is releasable under pressure.

In an alternative embodiment of the invention it is provided that, for moving the fastening means into its release position, a separate drive is provided for the sliding sleeve, the drive thus defined as controllable.

In order to be able to reliably define the final position of the sliding sleeve in its closed position, retaining means can be provided for fixing the sliding sleeve in its closed position.

In accordance with one exemplary embodiment of the invention, it is provided that the cover that closes the gas guide housing on one side has relief bores. If the sliding sleeve is not guided with a sufficient seal in the gas guide housing in the space located in front of the cover that defines the displacement path of the sliding sleeve, this advantageously ensures that gas pressure does not build up that could act against the displacement direction of the sliding sleeve. In addition, it can be provided that the relief bores are closed by the sliding sleeve when it is located in the closed position.

The movement of the sliding sleeve from its open position into its closed position can also be controlled in that arranged between cover and sliding sleeve is a spring for controlling the displacement of the sliding sleeve into its closed position.

To assist the displacement of the sliding sleeve, in accordance with one exemplary embodiment of the invention it can be provided that a spring is provided that biases the sliding sleeve in its closed position and that is supported on the gas guide housing.

In a further embodiment, the sliding sleeve can have a magnetic section to which on the exterior side of the gas guide housing is allocated a magnet assisting the movement of the sliding sleeve into its closed position in order to ensure sufficient movement of the sliding sleeve by the exterior drive. This arrangement can be provided both as an alternative to a spring drive and as a mechanism assisting such a spring drive.

For preventing the sliding sleeve from becoming jammed in the gas guide housing, e.g. due to particles of debris, it can be provided that the sliding sleeve is sealed from the wall of the gas guide housing by means of a sliding seal.

BRIEF DESCRIPTION OF THE DRAWING

One exemplary embodiment of the invention is shown in the drawing; it is described in the following:

FIG. 1 is a sectional view of a gas guide housing with gas generator and sliding sleeve with the sliding sleeve in the open position;

FIG. 2 is the subject of FIG. 1 with the sliding sleeve in the closed position.

DESCRIPTION OF PREFERRED EMBODIMENTS

A gas guide housing 10 has a connection opening 11 arranged radially in its wall for an airbag (not shown). Inserted concentrically in the gas guide housing 10 is a tubular gas generator 12 that is retained and fixed by a cover 13 disposed at one end face of the gas guide housing 10. A member 14 of the cover 13 engaging in the annular gap 15 between gas generator 12 and gas guide housing 10 surrounds the gas generator and ensures that it is concentrically fixed. At the same time the interior end face of the member 14 acts as a stop for the sliding sleeve (described hereinafter).

Arranged on the gas generator 12 and inserted in the annular gap between gas generator 12 and gas guide housing 10 is a sliding sleeve 16 that is displaceably guided along the gas generator 12 in the direction of the cover 13, whereby the sliding sleeve 16 has a circumferential recess 17 that is allocated to the connection opening 11 in the gas guide housing 10 and that is aligned with the connection opening 11 in the illustration in FIG. 1 in which the sliding sleeve 16 is in the open position. In addition, the sliding sleeve 16 is provided with at least one U-shaped open section 18 that is closed in the direction of the cover 13 and that exposes gas discharge openings 19 arranged in the gas generator 12 and thus permits the gas flow to flow outwardly into the annular gap 15 and then via the circumferential recess 17 of the sliding sleeve 16 to the connection opening 11.

In its open position illustrated in FIG. 1, there is a distance or spacing 20 from the sliding sleeve 16 to the end face end of the member 14 so that the distance 20 defines the possible displacement path of the sliding sleeve 16. In the closed position illustrated in FIG. 2, the member 14 constitutes a stop for the movement of the sliding sleeve 16.

As can be seen from FIG. 1, the sliding sleeve 16 is guided via an anti-rotation element so that it cannot be twisted relative to the gas guide housing 10, whereby the anti-rotation element is formed by a pin 22 that is inserted in the wall of the gas guide housing 10 and that engages in the sliding sleeve in a longitudinal slot (not shown).

Finally, in the rest position illustrated in FIG. 1, the sliding sleeve is fixed by means of a radially movable pin 23 as a releasable fastening means, whereby a separate, preferably pyrotechnic, drive 24 is allocated to the pin 23. If the drive 24 is actuated, the pin 23 is caused to disengage from the sliding sleeve 16 so that the sliding sleeve 16 is free to be displaced.

Finally, labeled 25 is a second connection opening for an airbag (not shown), whereby attached to the connection opening 11 is, e.g. an airbag for protecting the pelvic region of a vehicle occupant, and attached to the opening 25 is an airbag for protecting the chest of the occupant.

In a collision, the safety device is activated by a sensor (not shown), whereby the gas generator 12 is ignited by means of an initiator unit. The gas discharging out of the discharge openings 19 of the gas generator 12 flows in part through the circumferential recess 17 of the sliding sleeve 16 into the connection opening 11 of the airbag, which opening is aligned therewith and which airbag is provided to protect the pelvic region of a vehicle occupant.

Another part of the gas flow travels through the gas discharge openings 19 of the gas generator 12 via the U-shaped open section 18 in the sliding sleeve 16 into the region of the gas guide housing 10 facing away from the cover 13 in the direction of the second connection opening labeled 25 for the airbag that is provided to protect the chest of a vehicle occupant.

Since the outer diameter of the gas generator 12 and inner diameter of the sliding sleeve 16 are different, a gap is formed therebetween through which part of the discharging gas flow likewise travels in the direction of the second connection opening 25.

Since in the embodiment illustrated in FIG. 1 a pre-specified tolerance is provided between the outer diameter of the sliding sleeve 16 and the inner diameter of the gas guide housing 10, part of the gas flow likewise travels into the region of the gas guide housing facing the cover 13, in which region the distance 20 is. In order to provide pressure compensation here, relief bores 21 are provided in the exemplary embodiment illustrated in FIG. 1 for venting the gas.

In the embodiment illustrated in FIG. 2, a fitted shape is provided between the sliding sleeve 16 and the gas guide housing 10 so that no gas can travel into that region of the gas guide housing 10 facing the cover 13 and having the distance 20. Consequently there are also no relief bores 21 in the exemplary embodiment illustrated in FIG. 2.

The region between the sliding sleeve 16 and the cover 13 with the distance 20 is characterized equally in both exemplary embodiments by a low pressure level. in contrast, the region of the gas guide housing 10 facing away from the cover 13 has a high level of pressure, which is effected by the flow of gas described in the foregoing Because of this difference in pressure, in conjunction with the surface of the sliding sleeve 16, a force is formed that causes a fastening means to detach and the sliding sleeve 16 to be displaced in the direction of the member 14. The fastening means can be, e.g. a shear pin 22 that breaks when a certain force acts upon it.

In accordance with a further embodiment, a radially movable pin 23 with a pyrotechnic drive device 24 can also be provided that can be adaptively controlled by external criteria, e.g. severity of collision and/or occupant monitor by means of suitable sensors.

By virtue of the described difference in pressure, the sliding sleeve 16 is displaced in the gas guide housing 10 in the direction of the cover 13 until the sliding sleeve 16 reaches its closed position for the connection opening 11 (as shown in FIG. 2) at the lower end of the stop 14. When the sliding sleeve 16 is in the closed position, the connection opening 11 is closed so that the remainder of the gas flow flows completely to the second connection opening 25 and continues to inflate the airbag for the occupant's chest.

The pressure level in the airbag for the pelvic region of the occupant (connection opening 11) has its defined initial pressure immediately after the sliding sleeve 16 achieves the closed position.

For instance, the sliding sleeve 16 can be caused to be displaced prematurely when the vehicle occupant is light [in terms of weight] because to protect the pelvic region a lower pressure level is required in the airbag compared to when the occupant is heavier. Accordingly, control of the displacement of the sliding sleeve occurs very late when the occupant is heavy in order to obtain a high level of pressure in the airbag for the pelvic region that is connected to the connection opening 11.

In a situation-based adaptation of the airbag for the pelvic region, the airbag for the chest region is necessarily intentionally influenced. In addition to the two described airbags for the pelvic region and the chest region of a vehicle occupant, in accordance with the invention more than two airbags can also be provided that are supplied with gas via the gas guide housing 10.

The features of the subject of this document as disclosed in the foregoing specification, in the patent claims, in the abstract, and in the drawing can be essential individually or in any combination for achieving the invention in its various embodiments.

The specification incorporates by reference the disclosure of German priority documents DE 198 21 838.9 of May 15, 1998 and European Patent Application priority document PCT/EP99/03059 filed May 5, 1999.

What is claimed is:

1. An airbag arrangement in a safety system, comprising:
   a gas guide housing having radially formed in a wall thereof a first connection opening for connection of at least one inflatable airbag;
   a tubular gas generator disposed in said housing so as to form an annular gap between said generator and said housing;
   a sliding sleeve, as a valve member, disposed in said housing and extending concentrically around said gas generator, wherein said sliding sleeve is translationally displaceable in said annular gap relative to said first connection opening between an open position and a closed position of said first connection opening for controlling an inflation process of said at least one airbag; and
   a cover for closing off one side of said housing, wherein said cover acts as a stop for said sliding sleeve, wherein in a first position said sliding sleeve is disposed at a distance from said cover, which distance constitutes a possible displacement path for said sliding sleeve, such that gas released by said gas generator acts on one side of said sliding sleeve to establish different pressure levels on opposite sides of said sliding sleeve as viewed in a direction of movement thereof, and to cause said sliding sleeve to move to a second position, and wherein a second connection opening is formed on a side of said housing opposite said cover for connection of an additional airbag.

2. An airbag arrangement according to claim 1, wherein said sliding sleeve is provided with at least one U-shaped open section that extends in a longitudinal direction of said sliding sleeve and is closed in the direction of said closed position of said sliding sleeve, wherein said open section exposes gas discharge openings of said gas generator.

3. An airbag arrangement according to claim 2, wherein anti-rotation means is provided for guiding said sliding sleeve relative to said housing during displacement of said sliding sleeve.

4. An airbag arrangement according to claim 3, wherein said anti-rotation means is a pin that is disposed on said housing and engages in a linearly extending longitudinal slot of said sliding sleeve.

5. An airbag arrangement according to claim 2, which includes means for guiding said sliding element on said housing with a rotational movement that overlaps said translational movement thereof.

6. An airbag arrangement according to claim 5, wherein said housing is provided with a pin that engages a guide slot of said sliding sleeve, wherein said guide slot is helical in a longitudinal direction and extends circumferentially.

7. An airbag arrangement according to claim 2, which includes a releaseable fastening means for fixing said sliding sleeve in said open position thereof.

8. An airbag arrangement according to claim 7, wherein a separate drive is provided for said sliding sleeve for moving said fastening means into its release position thereof.

9. An airbag arrangement according to claim 7, wherein said fastening means is a shear pin.

10. An airbag arrangement according to claim 7, wherein said fastening means is a locking connection that is releaseable under pressure.

11. An airbag arrangement according to claim 2, wherein retaining means are provided for fixing said sliding sleeve in its closed position on said housing.

12. An airbag arrangement according to claim 2, wherein said cover for closing off one side of said housing is provided with relief bores.

13. An airbag arrangement according to claim 12, wherein said relief bores are closed off by said sliding sleeve when said sleeve is in its closed position.

14. An airbag arrangement according to claim 2, wherein a spring is disposed between said cover and said sliding sleeve for controlling displacement of said sliding sleeve.

15. An airbag arrangement according to claim 2, wherein a spring is supported on said housing and biases said sliding sleeve in its closed position.

16. An airbag arrangement according to claim 2, wherein said sliding sleeve is provided with a magnetic section, and wherein an outer surface of said housing is provided with a magnet that assists movement of said sliding sleeve into its closed position.

17. An airbag arrangement according to claim 2, wherein a sliding seal is provided for sealing said sliding sleeve against a wall of said housing.

18. An airbag arrangement according to claim 2, wherein a single housing is provided with a plurality of first connection openings, with a respective sliding sleeve being associated with each of said first connection openings.

* * * * *

UNITED STATES PATENT AND TRADEMARK OFFICE
CERTIFICATE OF CORRECTION

PATENT NO. : 6,322,102 B1
DATED : November 27, 2001
INVENTOR(S) : Rau et al.

Page 1 of 1

It is certified that error appears in the above-identified patent and that said Letters Patent is hereby corrected as shown below:

Title page,
Item [54] should read as follows,

-- [54] Title: AIRBAG ARRANGEMENT WITH CONTROLLED INFLATION --

Signed and Sealed this

Ninth Day of April, 2002

Attest:

JAMES E. ROGAN
*Attesting Officer*     *Director of the United States Patent and Trademark Office*